United States Patent [19]

Kiilunen

[11] 4,221,953
[45] Sep. 9, 1980

[54] WELDING ELECTRODE HOLDER AND GUIDE

[75] Inventor: John P. Kiilunen, Farmington Hills, Mich.

[73] Assignee: Weld Mold Company, Brighton, Mich.

[21] Appl. No.: 21,715

[22] Filed: Mar. 19, 1979

[51] Int. Cl.$^2$ .............................................. B23K 9/00
[52] U.S. Cl. .............................. 219/125.1; 219/137.7; 219/138
[58] Field of Search ............. 219/125.1, 124.33, 137.7, 219/138

[56] References Cited

U.S. PATENT DOCUMENTS

| | | | |
|---|---|---|---|
| 2,818,494 | 12/1957 | Bernard | 219/125.1 X |
| 3,046,387 | 7/1962 | Kiilunen | 219/125.1 |

Primary Examiner—E. A. Goldberg
Attorney, Agent, or Firm—Cullen, Sloman, Cantor, Grauer, Scott & Rutherford

[57] ABSTRACT

A pivotally adjustable welding electrode support is used to permit remote adjustment of the contact angle of the welding electrode with the material to be welded. The use of a modified parallelogram construction of the holding arm in combination with the use of hinges and a ball joint allow the torch or electrode to be moved not only in the horizontal and vertical plane but also permit remote rotational adjustment of the electrode to change the angle that the electrode makes with the horizontal plane. A ball socket supports the parallelogram structure of the arm. The modified parallelogram support linkage of the arm comprises two adjoining parallelogram shaped sections; one section is vertically offset from the other section. Each edge of each parallelogram shaped section contains a hinge to support movement of the electrode to change the angle of the electrode with the forge die or workpiece.

6 Claims, 6 Drawing Figures

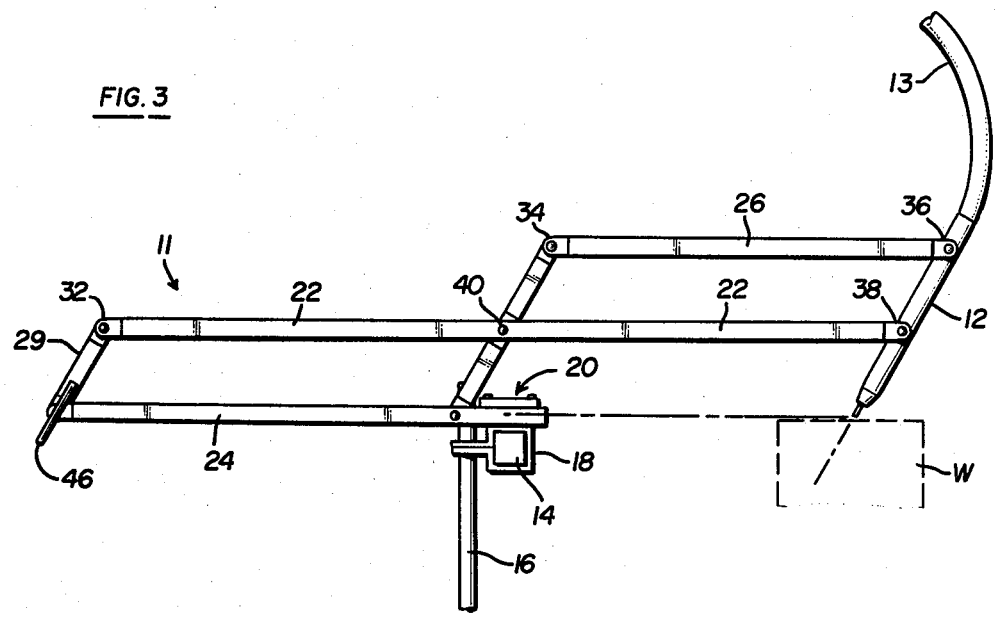
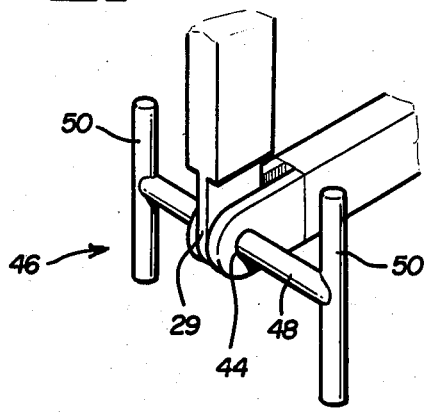
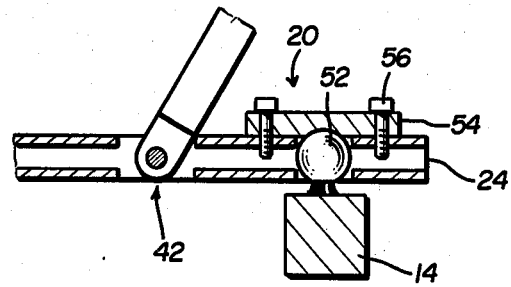
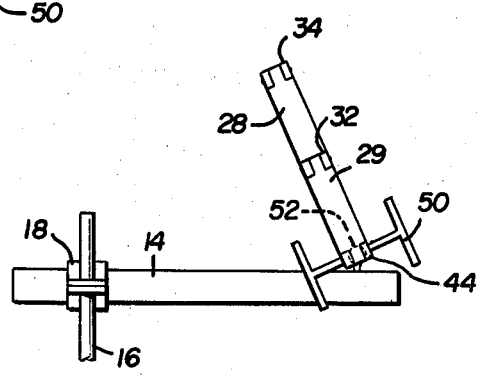

WELDING ELECTRODE HOLDER AND GUIDE

BACKGROUND OF THE INVENTION

The field of the present invention relates to arc welding and to support and adjustment of the welding electrode as it contacts the material which is being welded. The use of holding arms for welding electrodes permits the welder to remain away from the heat and the associated arcing and sputtering of flying metal. When the operator is further away from the welding piece he is able to take less safety precautions regarding clothing and, therefore, may more readily move to another job or quickly leave the welding site. One of the principal drawbacks of the prior art welder holding arms is its lack of directivity with regard to the welding electrode. That is, while the electode can be moved in the horizontal and vertical direction, the prior art does not provide for changing the angle of the electode of the welder with respect to the workpiece without considerable lateral or vertical movement of the hand controls while maintaining the same point of contact of the electrode with the work piece.

An example of the prior art welder holding equipment is shown in the U.S. Pat. No. 3,046,387 to Matt Kiilunen wherein an adjustable bracket is frictionally secured to a vertically disposed member. The bracket has two parallel bars shown as 72 and 74 in FIG. 2 of the '387 patent. The bracket further has pivot points on each end of the parallel bars shown as 82, 84, 86 and 88. These pivot points are used to allow the one end of the bracket containing the electrode holding means, generally shown as 100, to move vertically when a downward pressure is put on the other end of the bracket at the weighted section 94. Lateral movement of the bracket means is provided by the rollers 42, 44, 46 and 48 on the horizontal section 50 which section is the connecting means between the vertically disposed member 12 and the bracket parallel bars 72 and 74. As seen from the figures, the electrode holding means can be moved vertically or laterally and may be controlled by the operator from the opposite end of the bracket bars.

Although the flexibility in the vertical direction and in the lateral direction is shown by the prior art, there is disclosed no means or method of adjusting the angle that the electrode makes with the piece to be welded. In other words while the electrode may be moved up and down and side to side the angle it makes with the piece to be welded cannot change and, therefore, the welded piece itself must be continuously moved in order to change the angle of the welding process.

All materials to be welded do not have surfaces which continue in a straight line or which are susceptible to being followed by movement in the vertical direction or in the lateral direction alone. That is, some of the material contains corners and edges which require that the electode be moved to a position not as easily available in the prior art. Of course, a hand-held electrode which could be manipulated to fit any position is well known in the art, however, the advantages of the holder arm of the prior art are negated when the operator must come in such close contact with the welding.

The present invention retains the prior art advantages of remoteness from the welding process and in addition permits angular adjustment of the electrode with respect to the workpiece with a minimum lateral or vertical movement of the hand controls. This provides a more uniform flow and control of welding material as well as the ability to cope with uneven angles of the workpiece.

SUMMARY OF THE INVENTION

The welding electrode holder of the present invention has a vertically disposed mounting member and a horizontal member slidably attached frictionally at one end to the vertically disposed mounting member and rotatably attached at the other end to a bracket. The bracket has a pair of parallelogram shaped frames with one frame affixed adjacent to and vertically offset from the other frame such that the top of the one frame is common to and an extension of the bottom of the other frame, and one side of one frame is common to and an extension of one side of the other frame. Hinges are located at each of the corners of each of the two parallelogram shaped frames which together form the bracket. The hinges allow the two frames to form substantially all possible shapes while still retaining the parallelogram shape.

The electrode is attached to the bracket and forms one end thereof. The other end of the bracket contains a handle which is used to move the bracket by changing the angles of the parallelograms and thereby changing the angle of the electrode. The handle is also used to move the electrode in the vertical and transverse direction.

The present invention uses a ball joint located on the one end of the horizontal member which ball joint supports the bracket. This ball joint allows the bracket to be rotated about the ball joint without affecting the movement of the horizontal member or the vertically disposed mounting member. The present invention allows for electrode movement in the transverse direction not only by permitting a limited amount of transverse movement via the ball joint but also by permitting the horizontal member to be retained and slidably supported next to the vertically disposed mounting member. The horizontal member is mounted to the vertical member by means of a collar which allows the horizontal member to slide back and forth and may be affixed or tightened by any known means. Furthermore, the collar construction allows for the rotation of the bracket and horizontal member about the vertical member by having its vertical member retaining portion rotatably engaged therewith to facilitate the pivoting of the entire structure about the vertical member.

The present invention retains all of the advantages of the prior art electrode arm holders but provides an added dimension of flexibility to the positioning of the electrode by use of its parallelogram offset structure for the bracket in combination with the use of a ball joint to retain the entire bracket on the horizontal member. The handle structure of the present invention is located at the end of the bracket opposite the electrode structure and is affixed in such a manner as to operate with the use of both an up and down motion in order to move the electrode in a vertical plane. This handle structure facilitates the movement of the electrode in a precise manner and further permits a pivoting angular movement of the handle to force the parallelogram structure of the bracket to change angles to accommodate the angular position of the handle and, therefore, changes the angular position of the electrode with respect to the workpiece.

BRIEF DESCRIPTION OF THE DRAWINGS

FIG. 3 shows a flexed view of the holder of FIG. 2;

FIG. 4 shows the detail of the ball joint construction of the holder on the support; and FIG. 5 shows the handle arrangement for changing the position of the electrode.

FIG. 6 is a fragmentary section taken in the direction of arrows 6—6 of FIG. 2 but showing frame section and electrode tilted at an acute angle.

DETAILED DESCRIPTION

Figure 1:
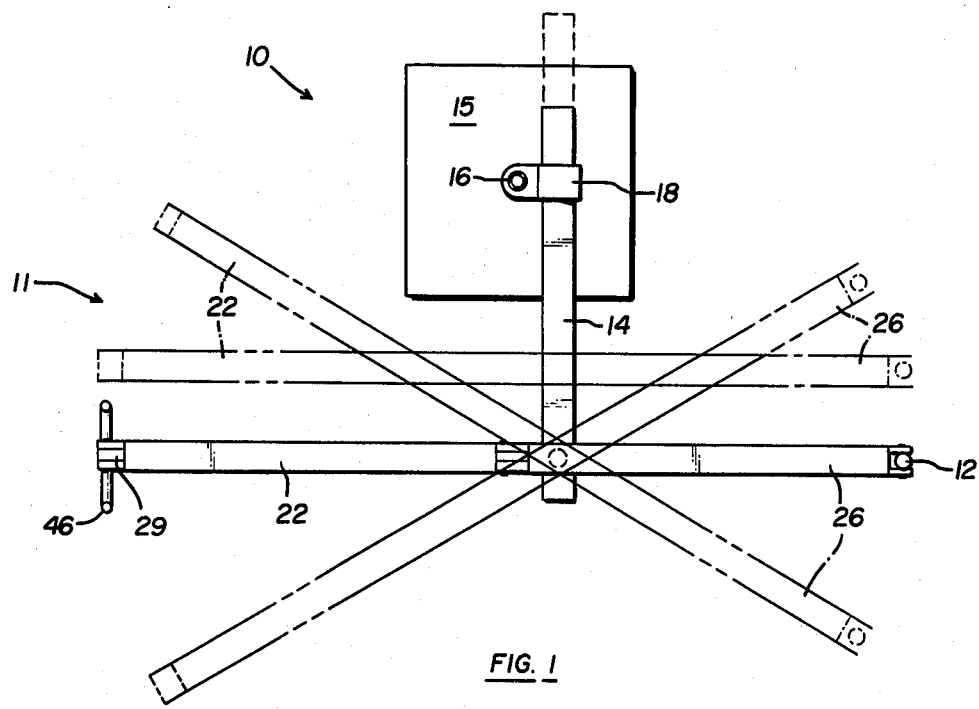
FIG. 1 shows a top view of the welding electrode holder and support of the present invention.
Figure 2:
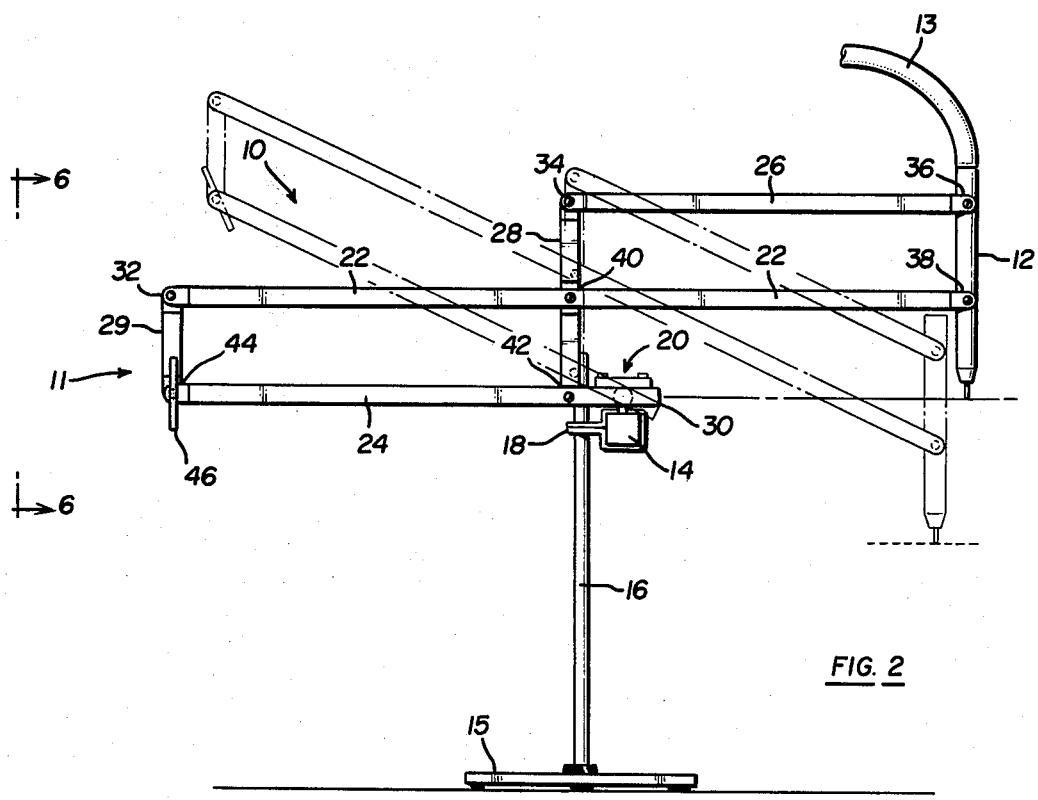
FIG. 2 shows a side view of the electrode holder of the present invention.

The welding electrode holding structure 10 of the present invention is detailed in the top view of FIG. 1 and the side view of FIG. 2 wherein the welder holder comprises a frame section 11 holding an electrode 12 which electrode is fed by wire feed 13. The frame section 11 is supported on a horizontal member 14 which is, in turn, supported on the base structure 15 by a vertical extending post 16. The horizontal member 14 is connected to the vertical post 16 by means of a two-way adjustable collar 18 which allows the horizontal member 14 to slide back and forth to move the frame member 11 as shown in FIG. 1, as well as adjustable to allow the entire structure including the horizontal member to slide vertically upon the post 16.

A ball joint 20 rotatably holds the frame structure 11 on the horizontal member 14. The frame member 11 comprises frame members 22, 24, 26, 28 and handle member 29, which, when combined with the electrode 12 as one end, form two vertically offset parallelogram structures with frame members 22 and 28 having a portion thereof as part of both parallelogram structures. The bottom 22 of one section is common to and extension of the top 22 of the other section. One side 28 of one section is common to and an extension of one side 28 of the other section.

A series of hinges 32, 34, 36, 38, 40, 42 and 44 are located at each corner of the two parallelogram shaped structures. All of the hinges are of the pin type with the hinges 32, 34, 36 and 38 being essentially the same in that each have a hinge pin located at the intersection point of a vertical member and a horizontal member. The hinge pin connection at 40 differs only in that the frame member 22 and 28 extend into both parallelogram sections, thus requiring a hinge pin connection with crossing members 22 and 28. Likewise, hinge section 42 differs in that section 24 extends beyond the intersection with member 28, thus requiring a hinge pin connection similar to that of 40. While the hinge pin connection of 44 is the same as the remaining corner sections 32, 34, 36 and 38, the hinge pin is replaced by a two-piece handle 46.

The handle which is used to control the angular position of the electrode 12 by means of changing the shape of the parallelogram structures is shown in conjunction with FIG. 5. The handle comprises a horizontal section 48 which acts as a hinge pin, the handle frame member 29, and two vertical sections 50 which are used to allow simplified manual control of the positioning of the electrode. Section 48 projects through and is fixed to handle frame member 29. That is, when the handles are rotated forward or backward as illustrated in FIG. 3, the parallelogram structure changes shape and the electrode 12 changes the angle that it makes with the workpiece W, FIG. 3. The angle of electrode 12 is always the same as the angle of inclination of handle member 29.

To change the angle of the electrode 12 from upright in FIG. 2, handle members 50 are manually rotated causing rotation of handle member 29 to the position shown in FIG. 3 relative to workpiece W. The parallelogram frames maintain the electrode 12 at all times parallel to handle member 29.

Typically, the parallelogram sections comprise one-inch by two-inch tubular aluminum channel sections which are appropriately cut and fitted for the particular hinge connections. FIG. 4 shows the modification to the channel section 24 in order to encompass the ball 52 of the ball joint section 20. Because of the hollow center of the tubular aluminum section, in order to obtain maximum frictional rotation of the frame section 11 about the ball 52, a small overlapping precut section 54 is fitted over the top of the section 24 and held there by a series of screws 56. This allows for a complete surface grip on the ball 52 to provide for stability and a substantially continuous surface over which the frame may rotate.

Aside from the change in the angular inclination of electrode 12 permitted by the parallelogram structure of frame 11 and the handle 46 as shown in FIG. 3, the various other degrees of freedom and movement permitted by the welder holder 10 are shown in phantom in FIG. 1 with the two crossed phantom frame structures illustrating the rotation of the frame 11 on the ball joint 20 and the parallel frame structure in phantom, indicating the freedom of the horizontal member 14 to slide in the collar 18. Two other degrees of freedom are not illustrated in the phantom drawings, but are permitted because of the freedom of the collar 18 to rotate about the vertical post 16 and to slide up and down the post. The movement associated with the horizontal structure 14 and the vertical post 16 in conjunction with the collar 18 requires that the collar normally be loosened prior to movement or be in such a loosened condition that care must be taken in handling the frame structure 11 so as not to slide the structure up or down the post 16 or horizontally when it is not desired to do so. For example, the force necessary to lift the frame 11 at the handle 46 in order to lower the tip of the electrode 12 may cause movement of the entire frame structure 11 down the vertical post 16 if the collar 18 is not suitably secured to the post 16.

As shown in dash lines in FIG. 2, frame section 11 may be adjusted in a vertical plane about ball joint 52. Members 22, 24 and 26 are inclined downwardly at an acute angle in order to lower electrode 12. If said electrode is to be upright as lowered, then handle 50 is rotated counterclockwise until said electrode is in an upright position as shown.

Frame section 11 may also be tilted laterally upon ball support 52 to an acute angle causing a corresponding lateral tilting of electrode 12, as in FIG. 6.

It may be appreciated that many changes and modifications may be made without departing from the spirit and scope of the present invention. Such modifications may include the use of a different material for the frame structure or the use of a different handle structure or a different arrangement of the attachment of the frame structure to a base support structure.

One of the most important features of this invention is the ability to change the angle of the electrode with none or very little lateral or vertical movement of the handles, while maintaining the same point of contact of the electrode with the workpiece.

The drawings illustrate an electrode holder or gun used for feeding continuous electrodes from a large coil or other type of package. This could be replaced with a stick electrode holder, allowing the manipulator to be used with stick electrodes.

Having described my invention reference should now be had to the following claims.

I claim:

1. A welding electrode holder comprising a vertically disposed mounting member;
   a horizontal member slidably attached adjacent one end to said vertically disposed mounting member;
   a frame means arranged in a vertical plane and intermediate its ends rotatably and universally mounted upon the other end of said horizontal member;
   said frame means having a pair of parallelogram shaped sections with one section affixed adjacent to and vertically offset from the other section such that the bottom of said one section is common to and an extension of the top of said other section and the one side of said one section is common to and an extension of the one side of said other section;
   hinge means located at each of the corners of each of said pair of sections to permit said sections to form substantially all possible parallelogram shapes;
   electrode means forming one end of said frame means; and
   handle means attached to the end of said frame means opposite from and at all time parallel to said electrode means for selectively modifying the shape of said sections, whereby manual rotation of said handle means to a predetermined inclination effects a corresponding and simultaneous inclination of said electrode means, manipulation of said handle means adjusts said electrode vertically, and lateral angular adjustment of said handle means tilts said electrode to a corresponding angle.

2. The welding electrode holder of claim 1, wherein said horizontal member is rotatably attached at said other end to said frame means by a ball joint and socket combination.

3. In the welding electrode holder of claim 1, said electrode means defining the other side of one of said sections;
   and said handle means defining the other side of the other of said sections.

4. In the welding electrode holder comprising a base structure having a vertical mounting post and a horizontal adjustable support member slidably attached to said vertical post wherein said support member retains a holding frame structure for movably engaging an electrode in contact with a welding surface, the improvement comprising;
   a ball joint for retaining said holding frame structure on said support member wherein said frame structure further includes a pair of parallelogram shaped sections with one section affixed adjacent to and vertically offset from the other section such that the bottom of said one section is an extension of the top of said other section and the one side of said one section is an extension of the one side of said other section;
   hinge means located at each of the corners of each of said pair of sections to permit said sections to form substantially all possible parallelogram shapes;
   said electrode defining the other side of one of said parallelogram sections.

5. The welding electrode holder of claim 4 further comprising a handle means attached to one end of said frame, defining the other side of the other of said sections.

6. The welding electrode holder of claim 5, wherein said electrode forms one end of said frame opposite said handle means end.

* * * * *